(12) United States Patent
Emanuel

(10) Patent No.: US 9,078,460 B2
(45) Date of Patent: Jul. 14, 2015

(54) GAS ENTRAINMENT IN FLOWABLE FOODS

(71) Applicant: George Emanuel, Arlington, TX (US)

(72) Inventor: George Emanuel, Arlington, TX (US)

(*) Notice: Subject to any disclaimer, the term of this patent is extended or adjusted under 35 U.S.C. 154(b) by 50 days.

(21) Appl. No.: 13/943,578

(22) Filed: Jul. 16, 2013

(65) Prior Publication Data
US 2015/0024102 A1 Jan. 22, 2015

Related U.S. Application Data

(63) Continuation-in-part of application No. 13/556,725, filed on Jul. 24, 2012, now abandoned.

(51) Int. Cl.

| | |
|---|---|
| A23L 1/00 | (2006.01) |
| B01F 3/04 | (2006.01) |
| A23L 1/307 | (2006.01) |
| A21D 8/02 | (2006.01) |
| B01F 5/04 | (2006.01) |
| B01F 5/06 | (2006.01) |
| A23G 1/00 | (2006.01) |
| A23G 1/52 | (2006.01) |
| A23G 3/34 | (2006.01) |
| A23G 9/20 | (2006.01) |
| A23G 9/22 | (2006.01) |
| A23G 9/46 | (2006.01) |

(52) U.S. Cl.
CPC ............. *A23L 1/0097* (2013.01); *A21D 8/025* (2013.01); *A23G 1/0073* (2013.01); *A23G 1/52* (2013.01); *A23G 3/0042* (2013.01); *A23G 9/20* (2013.01); *A23G 9/22* (2013.01); *A23G 9/46* (2013.01); *A23L 1/00* (2013.01); *A23L 1/307* (2013.01); *B01F 3/04099* (2013.01); *B01F 3/04446* (2013.01); *B01F 5/0473* (2013.01); *B01F 5/0476* (2013.01); *B01F 5/0652* (2013.01); *A23C 2210/30* (2013.01)

(58) Field of Classification Search
CPC .... B01F 3/04; B01F 3/04099; B01F 3/04446; A23L 1/00
USPC ............. 261/76, DIG. 16; 426/474, 564, 572; 99/516
See application file for complete search history.

(56) References Cited

U.S. PATENT DOCUMENTS

| | | | |
|---|---|---|---|
| 2,747,974 A | 5/1956 | Felger | |
| 2,755,075 A | 7/1956 | Tivoli | |
| 2,913,232 A | 11/1959 | Silverman | |
| 3,713,841 A * | 1/1973 | MacManus | .................. 426/474 |

(Continued)

FOREIGN PATENT DOCUMENTS

WO WO-2013/048873 A1 4/2013

*Primary Examiner* — Robert A Hopkins
(74) *Attorney, Agent, or Firm* — Mark D. Perdue; Paul V. Storm

(57) ABSTRACT

A method of entraining gas in a flowable food product comprising the steps of accelerating the flowable food product in a flow direction through a flow channel that includes a ramp. Gas is injected into the flowable food product transverse to the flow direction through a porous surface or plate while the food product traverses the ramp to generate a froth. An apparatus for entraining gas in a food product, comprises a source of flowable food product and a food product pump to accelerate the food product through a flow channel. A ramp is disposed in the flow channel as well as a porous surface forming a wall of the flow channel opposite the ramp. A source of gas is in communication with the porous surface, wherein gas is entrained in the food product as it passes by the ramp and the porous surface.

12 Claims, 1 Drawing Sheet

(56) References Cited

U.S. PATENT DOCUMENTS

| | | |
|---|---|---|
| 3,727,640 A | 4/1973 | Sargeant |
| 4,103,827 A | 8/1978 | Kumazawa |
| 4,552,286 A | 11/1985 | Kuckens et al. |
| 4,689,237 A | 8/1987 | Fabre |
| 5,514,267 A | 5/1996 | Machiya et al. |
| 5,520,856 A | 5/1996 | Garrett et al. |
| 5,935,490 A | 8/1999 | Archbold et al. |
| 6,557,834 B2 | 5/2003 | Ganan-Calvo |
| 7,338,551 B2 | 3/2008 | Kozyuk |
| 2002/0096792 A1 | 7/2002 | Valela et al. |
| 2007/0152355 A1 | 7/2007 | Hartley |
| 2009/0123385 A1 | 5/2009 | Bohmer et al. |
| 2011/0052778 A1 | 3/2011 | Abylov et al. |

\* cited by examiner

GAS ENTRAINMENT IN FLOWABLE FOODS

CROSS-REFERENCE TO RELATED APPLICATIONS

This application is a continuation-in-part application of U.S. patent application Ser. No. 13/556,725, filed Jul. 24, 2012.

TECHNICAL FIELD

The invention relates generally to methods and apparatus for entraining gas or generating bubbles of the gas in a liquid or semi-liquid food product.

SUMMARY OF THE PRIOR ART

The applicant is the sole inventor of U.S. Pat. Nos. 7,116,696; 7,336,689; and 7,397,836, all of which relate to generation of singlet delta oxygen for use in chemical lasers and other applications.

A step in the process of generating singlet delta oxygen is to generate a froth or entrain a gas into a flow of liquid basic hydrogen peroxide. The process is employed to generate singlet delta oxygen for use in chemical lasers.

It is known to entrain air to form bubbles in various food products, such as whipped cream, ice cream, and other substances.

Bubbles are important in many foods, e.g., bread, beer, ice cream, certain wines. In both bread and beer the fermentation process is driven by the air oxygen content in the bubbles. In addition to enhancing fermentation and providing effervescence, bubbles can increase palatability while reducing the mass of harmful substances ingested.

As the "obesity epidemic" in the United States gains more attention, methods of reducing fat, sugar, and salt in foods consumed becomes more and more important. It is known that whipping or entraining air in foods reduces the quantity of food ingested while maintaining the perception of a full meal or snack and also permits reduction in fat, salt, and sugar without reducing the taste perception or "tasteability" of these substances in gas-entrained foods. See Goh, S. M., Leroux, B., Groeneschild, C. A. G., and Busch, J. L. H. C., "On the Effect of Tastant Excluded Fillers on Sweetness and Saltiness of a Model Food," J. of Food Sci. 75, No. 4, pp. S245-S249 (2010). Further discussion of the use of bubbles in food products can be found in "Bubbles in Food," edit. by G. M. Campbell, C. Webb, S. S. Pandiella, and K. Niranjan, Eagan Press, St. Paul, Minn., USA, 1999.

It is known to use various devices to add a gas to a flowing liquid. Many of these employ a venturi (converging and diverging nozzles) and inject gas through one or more apertures at the throat (between the converging and diverging sections of the venturi). Examples of such devices can be found in U.S. Pat. No. 5,520,856 to Garrett; U.S. Pat. No. 5,935,490 to Archbold; U.S. Pat. No. 7,338,551 to Kozyuk; and U.S. Patent Publications 2002/96,792 to Valela and 2009/123,385 to Bohmer. Archbold discloses an oxygen dissolver for pipelines that injects oxygen through a plurality of straight holes in the converging section of a venturi. Garrett discloses a gas dissolver that injects gas through slots in both the converging and diverging sections of a venturi. Kozyuk discloses a device for generating micro bubbles in a fluid that uses a pair of venturis or baffles in series (one after the other), where gas is injected in the throat of the first venturi and cavitation is induced downstream of both venturis to form bubbles. Valela discloses a device for injecting gas into water that injects gas through a plurality of ports in the throat and divergent sections of a venturi. Bohmer discloses a method of dispersing particles of one fluid in another by injecting the first fluid through a series of holes transverse to the flow of the second fluid. No venturi is employed and the holes are formed in a substrate by etching, as in a semiconductor process.

None of these devices are particularly suited to generating a froth with bubbles with a diameter as small as one micron ($1 \times 10^{-6}$ meter or $\mu$) or less in a food substance that is rendered flowable.

A need exists, therefore, for improved methods and apparatus for entraining air or other gases in food products to enhance their taste and texture while decreasing the presence of fats, sugar, and salt.

SUMMARY OF THE INVENTION

It is a general object of the present invention to provide an improved method and apparatus for entraining gas into a flowable food product to generate a froth. This and other objects of the invention are achieved by a method of entraining gas in a flowable food product comprising the steps of accelerating the flowable food product in a flow direction through a flow channel that includes a ramp. Gas is injected into the flowable food product transverse to the flow direction through a porous plate while the food product traverses the ramp to generate a froth. An apparatus for entraining gas in a food product, comprises a source of flowable food product and a food product pump to accelerate the food product through a flow channel. A ramp is disposed in the flow channel as well as a porous surface forming a wall of the flow channel opposite the ramp. A source of gas is in communication with the porous surface, wherein gas is entrained in the food product as it passes by the ramp and the porous surface.

According to one embodiment of the present invention, the ramp follows a flow restriction in a flow channel and the porous surface.

According to one embodiment of the present invention, the porous plate has a plurality of random, non-linear pores.

According to one embodiment of the present invention, the pores range in average diameter from about 100$\mu$ to about 1$\mu$.

According to one embodiment of the present invention, the gas comprises air.

According to one embodiment of the present invention, the gas comprises one or more constituents of air.

Other objects, features and advantages of the invention will become apparent with reference to the drawings and the detailed description, which follow.

DETAILED DESCRIPTION OF THE INVENTION

The apparatus and method of the present invention can be used for efficiently entraining gas or producing gas bubbles in liquid and semi-liquid foods for the purpose of decreasing the salt, sugar, and/or fat content with a limited impact on flavor or palatability. For purposes of this application, the classification of the food product or substance as a "liquid" or "semi-liquid" or "gel" is not material. The food product must merely be flowable. The mixture of food product and entrained gas bubbles is referred to as a froth in which the entrained gas is in the form of small, non-spherical bubbles individually enclosed by a liquid film.

The gas may consist of any non-toxic gas, including air itself, i.e., nitrogen, oxygen, argon, carbon dioxide, or a mixture of these. The gas may be dry or contain water vapor. The gas may contain a flavorant, preservative, or other active ingredient or may be the active ingredient. The bubbles are produced by injecting the gas through a porous plate into a channel as disclosed herein that generates a near uniform froth across the channel. An average diameter of the near uniform bubbles in the froth can range from about 100μ ($3.94 \times 10^{-3}$ in) down to as small as about 1μ ($3.94 \times 10^{-5}$ in). The mass or volume fraction of the gas, relative to the liquid, can be controlled independent of the size of the average bubble diameter. The process is a continuous, efficient flow process. After production, the froth can be quickly cooled or frozen to maintain the entrained gas, e.g., for ice cream or chocolate, etc. Consequently, the long-term stability of the froth may not be a concern.

Figure 1:
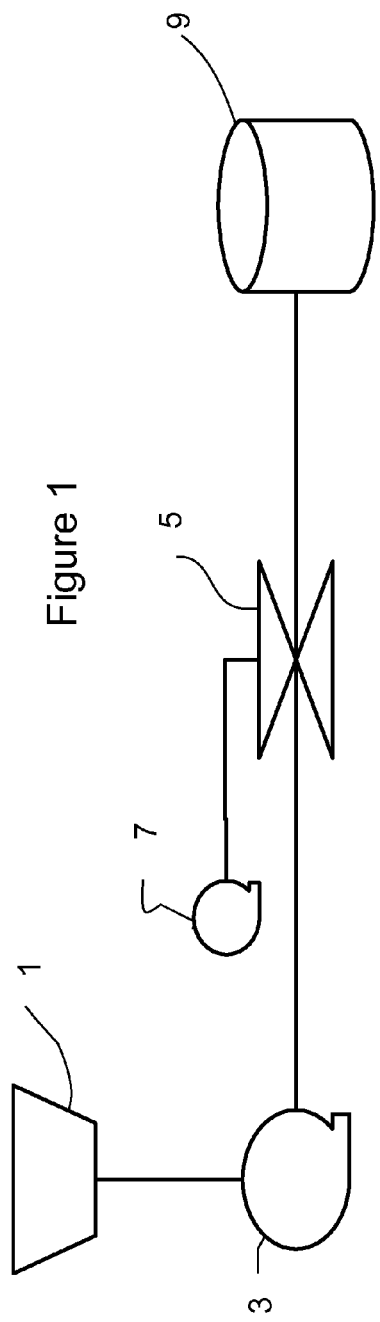
FIG. 1 is a schematic view of an apparatus according to preferred embodiment of the present invention.

FIG. 1 is a schematic depiction of a gas-entrainment apparatus according to an embodiment of the present invention. A food product source 1 is connected to a pump or other pressure source 3 to accelerate the flowable food product to a desirable velocity or pressure as it enters a froth generator 5, which is described in greater detail below. As stated, the food product need only be flowable, not necessarily liquid. Food product can be flowable in its native form, or rendered into a flowable state by agitation, melting, or the like. A gas source 7 is coupled to froth generator 5. In froth generator 5, gas from source 7 is entrained into flowable food product to produce a froth, which then passes from froth generator 5 into a storage vessel 9.

Figure 2:
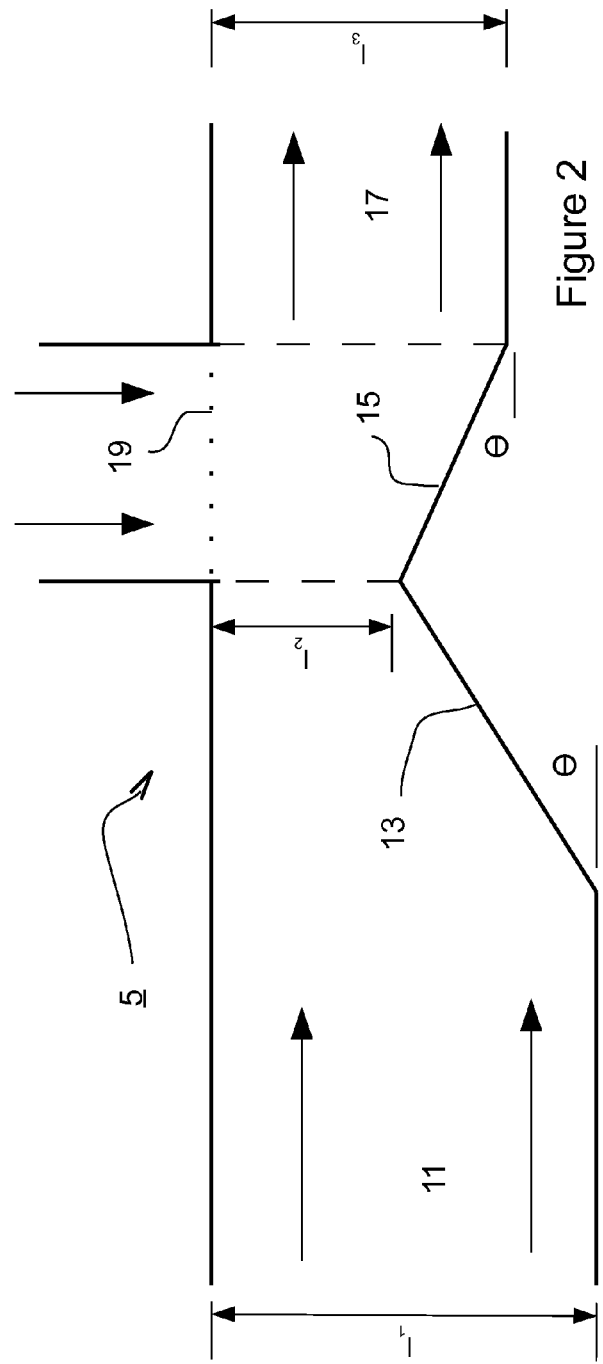
FIG. 2 is a side view of the froth generator portion of the apparatus according to the present invention.

FIG. 2 is a side-view of froth generator 5. It has a two-dimensional flow configuration and can be of any convenient width (the dimension perpendicular to the "paper"). In the proof-of-principle experiment, for visual observation, its side-plates were made of transparent plastic. Its walls can, e.g., be made of stainless steel, and the enclosing walls, as well as the flowable food product and entering gas, can be cooled to any desired temperature(s). Froth generator 5 has an inlet 11, an inlet inclined surface 13, a ramp 15, and an outlet or exit 17. A sintered stainless steel porous plate 19 replaces the wall section, and defines a porous surface directly opposite ramp 15 and has a linear length approximately the same as that of ramp 15 (as indicated by the dashed lines). An exemplary sintered stainless steel porous plate was made by Mott Corp., Farmington, Ct. While sintered stainless steel is the preferred and exemplary material, porous plate 19 may be formed of other materials, such as Hastelloy or Inconel (cobalt and nickel alloys, respectively), or even non-metallic materials having the characteristics of corrosion resistance and the ability to be formed into a porous plate with sufficient structural integrity and porosity, whether by sintering or otherwise.

Additionally, the pores produced by the sintering process are useful in the production of froth. Such pores are typically non-circular in cross section, tortured, irregular and random in shape and dimension and generally do not take linear (or even mathematically curved) paths through the plate. Instead, the pores are of essentially random or irregular size, cross-sectional shape, and configuration resulting from the agglomeration of metal or other particles during the sintering process. Therefore, sintered material is preferred to achieve the irregular or random, non-linear pores for a preferred embodiment of the invention, but other processes and materials may produce similar pores. The average pore size (diameter) of the plate can range from about 100μ ($3.94 \times 10^{-3}$ in) down to about 1μ ($3.94 \times 10^{-5}$ in). More regularly shaped (e.g. circular cross section, linear holes defining a cylindrical volume) are more likely to produce spherical bubbles. Non-spherical bubbles are preferred because their irregular shape fills a volume more efficiently and permits more of the flowable food product to take the form of a thin film than would spherical bubbles.

Gas from gas source 7 passes though the pores of porous surface or plate 19 for entrainment in the flowable food product, which is accelerated by the flow restriction produced by surface 13, and accelerates as it flows across ramp 15. While the fluid passes by porous plate 19, gas flowing through the pores or non-linear holes in porous surface or plate 19 is entrained in the food product and forms a froth, foamed, whipped or aerated food product. The gas passing through the porous surface or plate, with its non-linear pores, produces a froth in which the non-spherical enclosed phase (gas) is bordered by a very thin contiguous film of the second phase (flowable food product). Linear and circular or regularly shaped holes in a plate generate monodispersed and more spherical bubbles or particles rather than an amorphous aerated food product.

For the experiment, the inlet 11 height is $l_1 = 6.35 \times 10^{-3}$ (0.25"), the throat height is (at the intersection of surfaces 13 and 15) $l_2 = 7.5 \times 10^{-4}$ (0.0295"), the exit 17 height is $l_3 = 4 \times 10^{-3}$ (0.157"), and the width is $3.81 \times 10^{-2}$ (1.5") (not shown), where dimensions are in meters (inches). The length of the porous plate, in the liquid flow direction, is $2.54 \times 10^{-2}$ (1"). The two Θ angles are 9 degrees. Surrogate tests using water and nitrogen as well as chemical tests using liquid basic hydrogen peroxide and other vapors were performed. Both types of tests, over a wide range of liquid and gas flow rates, by visualization and measured performance, indicated consistent generation of a uniform froth.

The foregoing test used 40μ ($1.56 \times 10^{-3}$ inch) and 100μ ($3.94 \times 10^{-3}$) porous plates or surfaces (average pore diameter). Subsequent surrogate testing with 10μ ($3.9 \times 10^{-4}$ inch), 5μ ($1.95 \times 10^{-4}$ inch), and 2μ ($7.8 \times 10^{-5}$ inch), (average pore diameter) porous plates also demonstrated a stable and uniform froth with a bubble size decreasing with the average pore diameter of the plate.

A simple model was developed by the inventor for assessing froth generator 5. The model utilizes measured values for the liquid flow rate, for the gas flow rate, the known configuration, and measured pressures, $p_1$ (at inlet 11) and $p_3$ (at outlet 17). The analysis is based on Bernoulli's equation for state 1 upstream of the throat (where surfaces 13 and 15 intersect), and an approximate force balance for the irreversible flow between state 2 and 3 (at the throat and outlet 17, respectively).

The flow speed at state 3, $w_3$, is given by $$w_3 = \frac{1}{\dot{m}_f}\left[\frac{1}{2}(A_2 + A_3)(p_1 - p_3) + \left(\frac{3A_2 - A_3}{4A_2^2}\right)\frac{\dot{m}_l^2}{\rho_l}\right]$$

where
$\dot{rh}_f = \dot{rh}_g + \dot{rh}_l$
$A_2 = l_2 h$
$A_3 = l_3 h$
$\rho_l$ = liquid density and an f subscript denotes froth. The speed of sound, $a_f$, in a froth is much less than in either of its constituents. (See, e.g., Pai, S.-I., *Two-Phase Flows*, Ch. IV, Vieweg, 1977.) The speed of sound and corresponding Mach number, M, are evaluated as follows:

$$\rho_{f3} = \frac{\dot{m}_f}{A_3 w_3}$$

$$f_3 = \frac{\rho_l - \rho_{f3}}{\rho_l}$$

$$\rho_l = \frac{W_g p_3}{\overline{R} T_1}$$

$$a_{f3} = \left(\frac{p_3}{f_3 \rho_{f3}}\right)^{1/2}$$

$$M_3 = \frac{w_3}{a_{f3}}$$

where $W_g$ is the molecular weight of the gas, $\overline{R}$ is the universal gas constant, $T_1$ is the temperature of the entering liquid, and $M_3$ is an estimated state 3 Mach number. Because of the unusually small speed of sound, $M_3$ may be transonic or even supersonic. If supersonic, shock waves occur that can destroy the froth. Transonic and supersonic speeds at state 3 are avoided by primarily controlling the throat height $l_2$, relative to $l_3$, and the liquid flow rate.

Ramp 15 has several functions. It matches the length of porous plate 19 and, because $l_2 \ll l_3$, insures uniform penetration of the injected gas into the liquid, thus producing a uniform froth throughout the channel by the exit end of the ramp. A second function is to control $M_3$ to desired subsonic values. While a linear or flat ramp is illustrated, it could also be curved.

The importance of the ramp was demonstrated in tests at with a 100μ (3.94×10$^{-3}$ in) porous plate. The first test mixed 14.62 gpm of water with 309 mmole/s of nitrogen injected through a 100μ (3.94×10$^{-5}$ in) porous plate without a ramp. The second test mixed 13.39 gpm of water mixed with 303 mmole/s of nitrogen injected through the same porous plate, but with a ramp 15 opposite the porous plate 19 and of the same length. This testing showed complete mixing with uniform froth generation upstream of the end porous plate 19 when a ramp 15 of equal length was employed. On the other hand, in the absence of a ramp 15 mixing was still incomplete at the end of the porous plate 19. Tests such as this one, demonstrate the importance of using a ramp opposite to the porous surface or plate. As discussed above, care in choosing several design/operating parameters should be exercised to avoid transonic or supersonic froth flow. This possibility is due to the exceptionally low speed of sound in the froth. Further, cavitation in the fluid should be avoided to prevent destruction of the froth. Using the foregoing parameters, a froth having a bubble size on the order of 1μ (3.94×10$^{-5}$ inch) can be achieved at high flow rates and volumes.

In operation, a food product is rendered flowable and stored at least temporarily in source 1. It is then pumped (pump 3) or otherwise delivered to inlet 11 of froth generator 5. The narrowing inlet surface 13 accelerates the flowable food product as it approaches the throat and then expands over ramp 15 while gas is injected from gas source 7 into the food product as it passes porous plate 19. Gas is entrained into the food product and a froth is generated. For food applications, the preferred gas is air, but any of the constituents of air, e.g., nitrogen and oxygen, or other non-toxic gas would be suitable.

The present invention provides an improved method and apparatus for injecting a gas, in the form of small bubbles, into a liquid or gel food for the purpose of lowering the salt, sugar, and/or fat content of the food. The gas may be air, consist of air constituents, such as oxygen, or other non-toxic gas. The gas is injected into the liquid through a porous plate or surface, made, e.g., of sintered stainless steel. The gas flows through the plate in the non-linear paths defined by the pores and mixes with the passing flowable food product to form a froth with relatively small, non-spherical bubbles. By opposing the exit surface of the porous plate with a ramp 19, a nearly uniform froth is generated, at least, near the end of the ramp. The froth is believed to consist of non-spherical bubbles, each vapor bubble is believed to be incased in a liquid film. The average bubble size is controlled by the average pore size of the porous plate. Thus, the liquid-to-gas mass or volume ratio can be controlled independent of the average bubble size, which is controlled by the choice of the pore size of the porous plate.

The invention has the further advantage of scalability, being a two-dimensional flow device. Another advantage is that it is a steady flow process, as compared to a batch process. The hardware and flow constituents are readily heated or cooled to any desired temperature(s).

What is claimed is:

1. Apparatus for entraining gas in a food product, comprising:
   a source of flowable food product;
   a food product pump to accelerate the food product through a flow channel;
   a ramp in the flow channel;
   a porous surface forming a wall of the flow channel opposite the ramp;
   a source of gas in communication with the porous surface, wherein gas is entrained in the food product as it passes by the ramp and the porous plate.

2. The apparatus according to claim 1, wherein the ramp immediately follows a restriction in the flow channel.

3. The apparatus according to claim 1, wherein the porous surface is a sintered plate that has a plurality of non-linear pores extending therethrough.

4. The apparatus according to claim 3, wherein the pores range in average size from about 100μ to about 1μ.

5. The apparatus according to claim 1, wherein the gas comprises air.

6. The apparatus according to claim 1, wherein the gas comprises one or more constituents of air.

7. Apparatus for entraining gas in a food product, comprising:
   a source of flowable food product;
   a food product pump to accelerate the food product through a flow channel;
   a flow restriction in the flow channel;
   a ramp in the flow channel immediately after the flow restriction;
   a porous surface forming a wall of the flow channel opposite the ramp;
   a source of gas in communication with the porous surface, wherein gas is entrained in the food product as it passes by the ramp and the porous plate.

8. The apparatus according to claim 7, wherein the ramp immediately follows a restriction in the flow channel.

9. The apparatus according to claim 7, wherein the porous surface is a sintered plate that has a plurality of non-linear pores extending therethrough.

10. The apparatus according to claim 9, wherein the pores range in average size from about 100μ to about 1μ.

11. The apparatus according to claim 7, wherein the gas comprises air.

12. The apparatus according to claim 7, wherein the gas comprises one or more constituents of air.

\* \* \* \* \*